March 2, 1937. E. J. VON PEIN 2,072,436
SCALE
Filed March 9, 1935 3 Sheets-Sheet 1
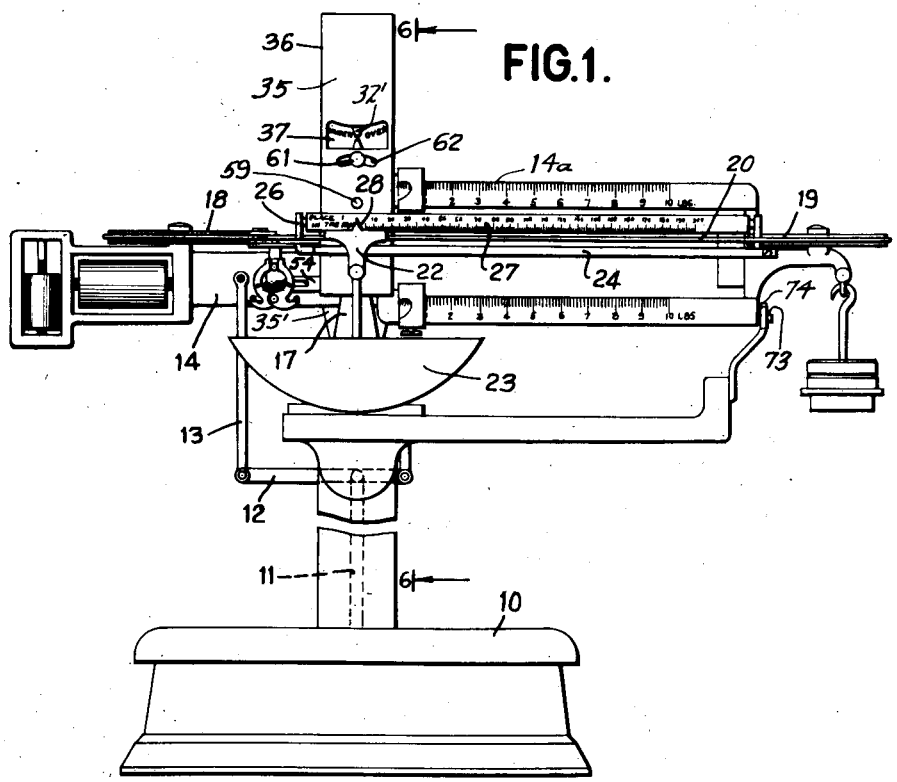
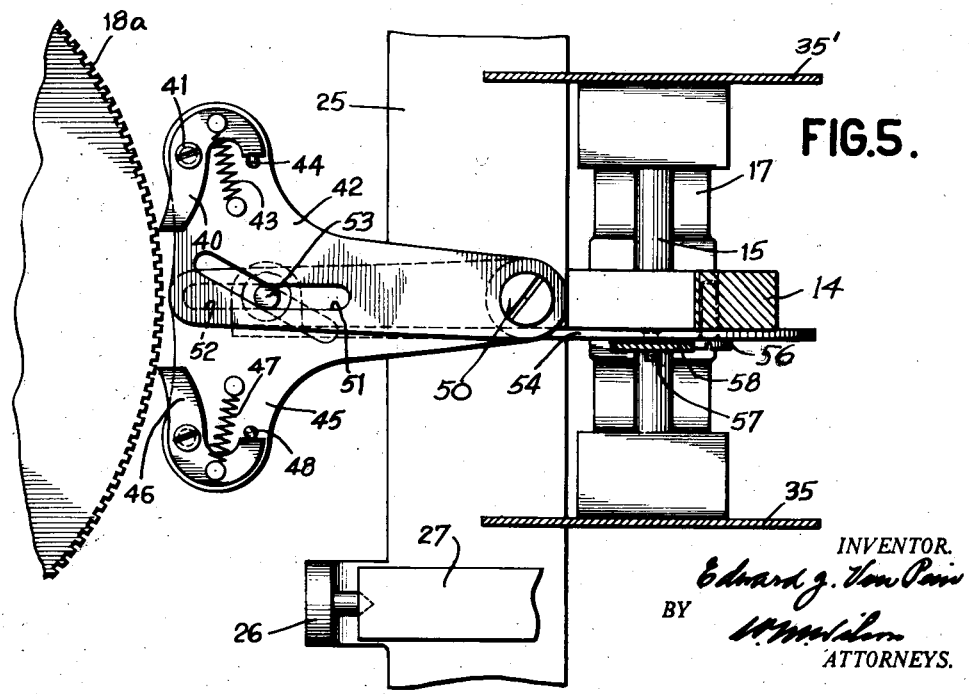
INVENTOR.
Edward J. Von Pein
BY
ATTORNEYS.

March 2, 1937.  E. J. VON PEIN  2,072,436
SCALE
Filed March 9, 1935  3 Sheets-Sheet 2
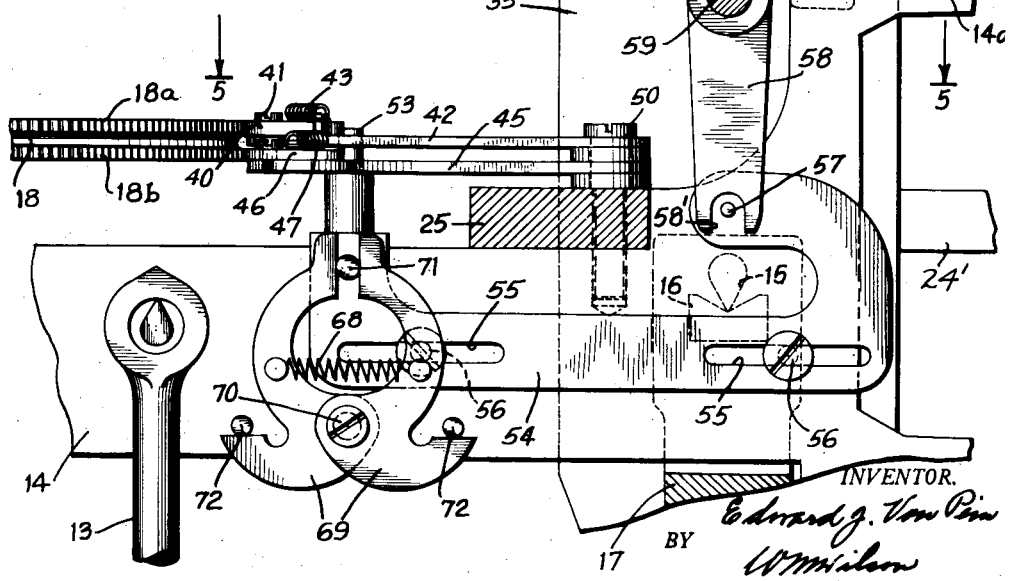

March 2, 1937.  E. J. VON PEIN  2,072,436
SCALE
Filed March 9, 1935  3 Sheets-Sheet 3
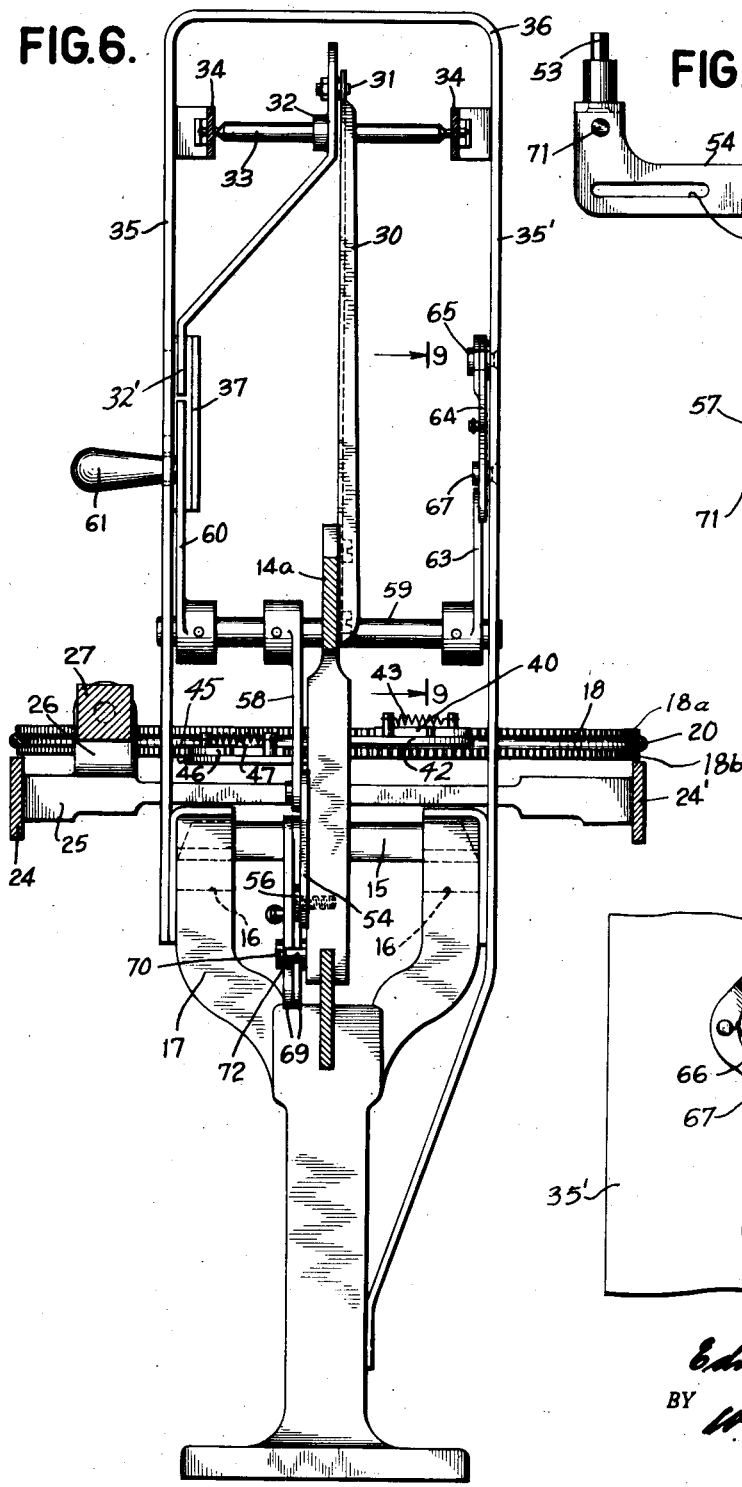
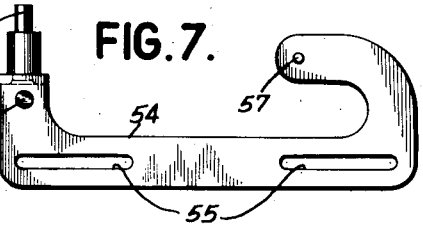
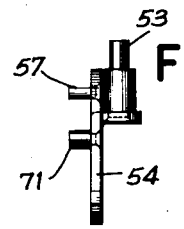
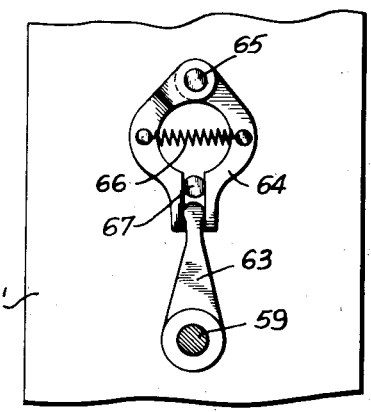
INVENTOR.
Edward J. Von Pein
BY
ATTORNEYS.

Patented Mar. 2, 1937

2,072,436

UNITED STATES PATENT OFFICE 2,072,436

SCALE

Edward J. Von Pein, Dayton, Ohio, assignor to International Business Machines Corporation, New York, N. Y., a corporation of New York Application March 9, 1935, Serial No. 10,255

16 Claims. (Cl. 265—31)

This case relates to weighing scales particularly to beam scales of the type used for counting an unknown number of pieces on the platform.

The particular beam counting scale known as the "National" has a platform on which an unknown number of articles is placed to be balanced by one or more pieces in a ratio pan riding on the beam. The number of pieces on the platform is indicated by the beam when it comes to an even balance position. The movements of the beam being extremely small, it is difficult to tell when the scale has come to balance. Further, the final increment of adjustment of the ratio pan to the balancing position is difficult to effect with any degree of sensitiveness with known arrangements.

The object of the present case is to provide a multiplied, easily readable, and readily detectable indication of the beam balance.

Another object is to provide means for sensitively and accurately effecting the balancing adjustment of the ratio pan.

Other objects will be clear from the further parts of the description and from the drawings.

Fig. 1 is a front, elevational view of the scale;

Fig. 2 is a vertical detail view, partly sectioned, and with surface parts broken away to show the interior, of the portion of the scale embodying the invention;

Figs. 3 and 4 are details of the two pawl-carrying plates of the ratio pan adjustment means;

Fig. 5 is a section along line 5—5 of Fig. 2;

Fig. 6 is a section along line 6—6 of Fig. 1;

Fig. 7 is a detail of the ratio pan adjustment means;

Fig. 8 is an end view of Fig. 7, and

Fig. 9 is a section along line 9—9 of Fig. 6.

While for purposes of illustration, the invention will be disclosed in its application to a counting scale essentially disclosed in Patent No. 639,830, it is understood the invention may be utilized with other scales utilizing beams and adjustable counterpoises.

Referring to Fig. 1, the effect of the load on platform 10 is transmitted through base levers (not shown), to draft rod 11, an intermediate lever 12, another draft rod 13, and then to main beam 14. The main beam has a knife edge 15 coacting with bearings 16 of frame 17 to pivot the beam on the frame. At opposite ends of the beam are journaled grooved pulleys 18 and 19 around which an endless belt 20 runs.

One side of the belt is connected to a slide 22 from which is suspended the ratio or unit pan 23. Slide 22 is mounted, for movement along the beam, on a guide rail 24 secured at the right hand end (Fig. 1) directly to the beam and at the other end to one end of a cross bar 25 (Figs. 2, 5 and 6). To the opposite end of cross bar 25 is fixed a parallel guide rail 24' for mounting a poise (not shown) to balance the weight of unit pan 23 and slide 22 in all positions of the latter elements so that only the weight of the unit pieces in ratio pan 23 balances the weight of the articles on platform 10. Cross bar 25, intermediate its ends, is provided with an upright lug 26 having means to journal one end of a four-sided bar 27, the other end of which is journaled on the main beam. each side of bar 27 has a set of figures calibrated according to the number of pieces in unit pan 23 to indicate the count of pieces on the platform. Thus, with one piece in pan 23, one side of bar 27 will be turned to present a side marked with directions to place 1 piece in the pan.

The other three sides may be marked to place different numbers of pieces in the pan, so that with the specified number of pieces in the pan, the corresponding side of bar 27 will be read to indicate the total count of pieces on the main platform 10.

The graduations of bar 27 are indexed by a pointer 28 upwardly extending from slide 22.

When a load consisting of an unknown number of pieces is applied to platform 10, a suitable number of such pieces is placed in ratio pan 23 and counting bar 27 adjusted accordingly. The operator then grasps slide 22 to move the ratio pan along beam 14 until the beam comes to balance. The graduation of bar 27 opposite pointer 28 then indicates the number of pieces on platform 10.

A slight deviation from true even balance position of beam 14 is difficult to observe and this may result in an error of a number of pieces in the total count. To provide a multiplied, accurate, readily observable indication of the beam balance, the following means are provided: Referring to Figs. 2 and 6, to the upper branch 14a of beam 14 is fixed a vertically extending arm 30 the upper part of which is bent horizontally and forked at the outer end to receive a pin 31 provided on the upper arm of a lever 32 pivoted intermediately on a shaft 33. This shaft is journaled on brackets 34 carried by the opposite front and back walls 35 and 35' of a housing 36, extending above beam 14. The lower ends of walls 35 and 35' are fixed to the frame 17 to rigidly support the housing 36 on the frame.

Lever 32 is in static balance; that is, its opposite arms are balanced so as to avoid any pendulous effects which might affect the balance of the beam. Front wall 35 carries an under and over chart 37 having an even balance mark 37'. Lever 32 is bent to position the lower, pointer end 32', in front of chart 37. The lower arm of lever 32 is about six times longer than the upper arm of lever 32 between pivot 33 and pin 31 so that pointer 32' will multiply the movement of pin 31 and therefore of arm 30 of the beam about six times. Any other multiplication may be had by varying the length of arm 30 and the ratio of the opposite arms of lever 32.

When pan 23 is moved too far to the right (Fig. 1), beam 14 and its connected arm 30 rock clockwise from their balance positions. As arm 30 rocks clockwise, it swings lever 32 clockwise to move pointer 32' along the "Under" range of chart 37. This indicates that the number of pieces on platform 10 is less than the figure given by bar 27. Pan 23 is thereupon moved to the left, causing the beam to rock counterclockwise and arm 30 to rock pointer 32' to the right towards the even balance mark 37'. Should the unit pan be moved too far to the left, pointer 32' will move too far to the right and along the "Over" range of chart 37. This indicates that the number of pieces on the platform is greater than the figure indicated on bar 27. Only when the unit pan is correctly adjusted, will the beam be in true balance position with pointer 32' directly at even balance mark 37' of the chart. The number of pieces on platform 10 is then read off bar 27.

It may be noted that by disposing the means for giving a multiplied indication of the beam balance near the pivot of the beam and directly above the platform, that the operator stationed at the platform may conveniently observe the movement of pointer 32'.

In order to provide a sensitive adjustment of ratio pan 23 to bring pointer 32' to its balance position, the following means are provided: The rim of pulley 18 above and below the belt guiding groove is formed with teeth 18a and 18b. Opposite teeth 18a is a pawl 40 pivoted at 41 to a plate 42 (Figs. 2, 3, 5 and 6). A weak spring 43 connecting the pawl to the plate normally holds the tail of pawl 40 against a stop pin 44 which in the initial position of the plate holds the pawl free of teeth 18a. Below plate 42 is a similar plate 45 (Fig. 4) which pivotally carries a pawl 46, opposite teeth 18b. A spring 47 normally holds the rear end of pawl 46 against stop pin 48 which in the initial position of plate 45 locates the pawl free of teeth 18b.

Both plates 42 and 45 are pivoted on a vertical stud 50 passing through cross bar 25 and threaded into beam 14. Plate 42 has an obtuse-angled slot 51 with a rear portion extending along the longitudinal axis of the beam and a forward portion inclined to the longitudinal axis of the beam. Plate 45 also has an obtuse-angled slot 52 with a rear portion inclined to the longitudinal axis of the beam and a front portion extending along the longitudinal axis of the beam. Passing through both slots 51 and 52 is a vertical pin 53 projecting upwardly from a plate 54 lying in a vertical plane along a side of beam 14 which is parallel to the longitudinal axis of the beam.

Plate 54 has horizontal slots 55 for receiving guide studs 56 carried by the side of beam 14 and is thus slidably mounted along the side of the beam for horizontal movement. Plate 54 also has a horizontal stud 57 located within a slot 58' at the lower end of an arm 58 dependently and rigidly carried by a shaft 59 journaled between side walls 35 and 35' of housing 36. Adjacent wall 35, shaft 59 rigidly carries an upwardly extending arm 60 provided with a handle 61 extending to the outside of the housing through an arcuate slot 62 in wall 35. The upper end of arm 60 is pointed and disposed in front of chart 37. The rear end of shaft 59 carries an arm 63 (see Figs. 6 and 9), the free end of which is gripped between jaws 64 pivoted at 65 to rear wall 35' of the housing and urged by a spring 66 between them to forcibly grip the free end of arm 63. The movement of each jaw 64 under the pull of spring 66 is limited by engagement with a pin 67 on the rear housing wall 35'.

When handle 61 is moved to rock shaft 59 in either direction it does so against resistance of spring 66 acting through jaws 64 and arm 63. Thus, spring 66 normally holds shaft 59 in a central position with the opposite arms 58 and 60 vertical. The pointed upper end of arm 60 will thereby normally stand opposite even balance mark 37' of chart 37 while the sides of slot 58' at the lower end of arm 58 will normally be held free of contact with pin 57 of plate 54. For convenience, the means consisting of jaws 64, spring 66, pin 67, and arm 63 may be termed an equalizer for shaft 59 and its parts.

Plate 54 also has a central position determined by the action of a spring 68 (Fig. 2) on a pair of jaws 69 pivotally carried on a stud 70 extending from the side of beam 14 and gripping between them a pin 71 extending from the side of plate 54. The movement of each jaw 69 under the pull of spring 68 is limited by engagement with pins 72 extending from beam 14. Jaws 69 and springs 68 form an equalizer to oppose movement of plate 54 to either side of its central position.

Pin 53 of plate 54 lies along the longitudinal axis of the beam and determines by its position the positions of plates 42 and 45. When pin 53 is in normal, central position, it passes through the vertices of the slots 51 and 52 of the plates 42 and 45 and holds the latter plates in their normal positions with both pawls 40 and 46 free of their respective toothed elements 18a and 18b.

When the beam oscillates in either direction under the effect of the forces on platform 10 and pan 23, the entire assembly of plate 54, jaws 69, plates 42 and 45 and pulleys 18 and 19 moves as a rigid part of the beam. The limits of the beam oscillation are determined as usual by engagement of pin 73 on its counterpoising end with the upper and lower ends of trig loop 74 (Fig. 1). Within these limits, pin 57 of plate 54 does not touch the sides of the slot 58' at the lower end of arm 58 when the latter is in its central, vertical position. Thus, the beam normally rocks freely without interference from the arm 58 and its associated parts.

As previously explained, if under a load on platform 10, ratio pan 23 is adjusted too far to the right (Fig. 1), the beam rocks below its even balance position and arm 30 moves pointer 32' along the under range of chart 37; if pan 23 is adjusted too far to the left, then the beam rocks above its even balance position and pointer 32' is moved into the over range of chart 37. If pointer 32' is at the under side of chart 37, pan 23 must be moved to the left. To effect this with precision, the operator grasps handle 61 and moves it along the over field of chart 37. As a result of this movement, shaft 59 rocks clockwise (Fig. 2) and the right hand wall of slot 58' engages pin 57 and actuates slide plate 54 to the left (Fig. 2) against resistance of spring 68 which is acting on pin 71 of the slide plate through the left hand jaw 69. As the slide moves to the left, its pin 53 also moves in the same direction and into forward portions of slots 51 and 52 of their respective plates 42 and 45. Since the forward portion of slot 52 extends along the longitudinal axis of the beam and since pin 53 is moving along said axis to the left (Fig. 2), the pin has no tendency to move plate 45 about its pivot 50 but on the contrary maintains the latter plate in its initial position with pawl 46 free of teeth 18b.

However, as pin 53 moves to the left into the inclined, forward portion of slot 51, it cams plate 42 counterclockwise (Fig. 5) about its pivot 50. This brings the nose of pawl 40 into engagement with teeth 18a of pulley 18 and by such engagement as plate 42 rocks counterclockwise, pawl 40 rotates pulley 18 clockwise (Fig. 5). Belt 20 thereupon moves ratio pan 23 to the left, nearer to the beam fulcrum, thus causing the beam to rock counterclockwise and arm 30 to move pointer 32' to the right from a position along the under side of the chart 37 towards the even balance mark 37'.

Thus, movement of handle 61 to the right, along the over portion of chart 37 causes pointer 32' to move in the same direction towards the balance mark 37'. Since the ratio pan is first adjusted roughly by direct actuation of slide 22 to an approximately correct position on the beam, a single stroke of handle 61 is usually of sufficient range to effect the final and sensitive adjustment of the ratio pan. The handle 61 is actuated only until the pointer 32' stands at mark 37' whereupon the operator immediately releases the handle and spring actuated jaws 64 return the handle and arm 58 to their central, vertical position. As arm 58 returns towards normal, it also returns slide 54 towards its central position. The final return movement of slide 54 to its central position is effected by spring-actuated jaws 69. Thus, under automatic operation of their respective equalizers, arms 58 and 60 and plate 54 are returned to their central normal positions in which slot 58' is free of pin 57, so that beam 14 is freed of any external, reactive or interfering influence.

As slide 54 returns to normal, it returns plate 42 and its pawl 40 clockwise, to initial position (Fig. 5). As pawl 40 returns, spring 43 yields to cause the pawl to move along teeth 18a without imparting movement to pulley 18 until the pawl nose is again free of teeth 18a.

If a single stroke of handle 61 is not enough to locate pointer 32' opposite mark 37', the operator may move handle 61 through several strokes, each time releasing the handle for automatic return to even balance mark 37'. Each stroke of the handle to the right causes pawl 40 to move pulley 18 clockwise, in the manner as explained above, through another increment of rotation to correspondingly shift ratio pan 23 to the left.

If in this adjustment, pointer 32' moves past mark 37' and into the over field of chart 37, the operator rocks handle 61 to the left until the pointer stands exactly opposite the mark. As handle 61 is moved to the left, arm 58 moves to the right and actuates slide 54 in the same direction. Pin 53 of the slide thereupon moves into the non-inclined rear portion of slot 51 of plate 42 and into the inclined rear portion of slot 52 of plate 45. As a result, plate 42 is maintained in its initial, inactive, position while plate 45 is rocked clockwise (Fig. 5), causing its pawl 46 to engage teeth 18b and move pulley 18 counterclockwise (Fig. 5). This moves ratio pan 23 to the right, thereby rocking the beam clockwise to cause arm 30 to move pointer 32' to the left towards even balance mark 37'. As soon as the operator releases handle 61, spring actuated jaws 64 return it to normal position with the upper pointed end of arm 60 opposite mark 37' while at the same time spring actuated jaws 69 return slide 54 to normal position.

It may be noted that the disposition of the means for finely adjusting the ratio pan near the beam fulcrum and above the platform is convenient to the operator standing adjacent the platform. Further, pin 57 being near the fulcrum of the beam, its movement upon rocking of the beam is slight. Thus pin 57 is conveniently arranged to be free of the sides of slot 58' in any position of the beam and with arm 58 in its central position. Again, the pointer end of arm 60 and the pointer 32' both coact with the same chart 37 and same mark 37'. Further, housing 36 is common to part of the adjusting means for the ratio pan as well as to part of the indicating means for indicating the beam balance.

Still further, a large movement of the handle 61 and the connected element 54 causes a comparatively slight ratcheting movement of pulley 18. In other words, pawls 40 and 46, their plates 42 and 45, and teeth 18a and 18b provide a ratcheting connection to the counterweight comprising the load in ratio pan 23 or constitute a movement-reducing or step-down connection between slide 54 and pulley 18.

Thus, a practically micrometer movement of the ratio pan 23 can be produced by an ordinary, comparatively large movement of slide 54 and its operating device 58—60—61.

Briefly, the operation of the scale is as follows: An unknown number of pieces to be counted is placed on platform 10 and one or more such pieces placed in ratio pan 23. The pan is then moved along the beam until the beam is approximately in balance. That the beam is not in exact balance will be indicated by the position of pointer 32' to either side of even balance mark 37'.

After the approximate adjustment of pan 23, the operator moves handle 61 in the same direction in which pointer 32' must move to come to even balance mark 37'. The movement of handle 61 in said direction actuates plate 54 which through its pin 53 rocks one of plates 42 or 45 to rotate pulley 18 through a small angle. The movement of pulley 18 moves pan 23 towards its correct position of adjustment. When pointer 32' reaches mark 37', the operator releases handle 61 which is thereupon automatically returned by its equalizer 63—64—66 to its normal central position while plates 54, 42, and 45 are automatically returned to central, normal position by the equalizer 68—69—71.

The operator then reads the graduated bar 27 at index pointer 28 for the number of pieces on platform 10.

Variations and departures from the form of the invention disclosed herein but which employ the principles of the invention, are intended to be covered by the following claims.

I claim:

1. In a scale, a supporting standard, a beam fulcrumed on said standard and having an even balance equilibrium position, a vertically disposed housing having front and back walls straddling the sides of the beam and secured to said standard, said housing having a sight window and an under-and-over chart exposed through said sight window, a vertically disposed index hand inside the housing and provided at one end with a pointer, exposed through the sight window, for movement along said chart, a vertical arm rigidly extending from the beam and located inside said housing at one side of the index hand and having its outer portion bent laterally towards the index hand to dispose its free end in vertical alinement with the pivotal axis of the index hand, and a pin and slot connection between the free end of the bent over portion of said arm and the index hand to impart movement to the hand proportional to movement of the beam, the hand being statically balanced to eliminate any pendulous reaction effects thereof on the beam, said connection between the hand and said arm being a less distance from the pivotal axis of the hand than the distance from said axis to the pointer whereby the latter has a movement multiplied with respect to the beam and said arm for indicating in cooperation with said chart the position of the beam with respect to its even balance equilibrium position.

2. In a scale, a supporting standard, a beam fulcrumed on the standard and having an even balance equilibrium position, a vertically disposed frame secured to the standard and having a chart provided with an even balance mark exposed to view above the beam, an index hand carried by the frame and having a pointer end for movement along the chart, a connection between the beam and index hand for moving the hand proportionally to the beam movement and said pointer end along said chart to indicate the position of the beam with respect to the even balance position of the latter, a counterweight mounted on the beam for movement to a balancing position along the beam to bring the latter to equilibrium position and the pointer end to the even balance mark, and means for moving the counterweight to the balancing position comprising a manipulative device carried by the frame and having an index portion disposed for movement along the chart and connections between the manipulative device and said counterweight for moving the latter to the balancing position upon movement of the device such that its index portion moves along the chart in the same direction in which the pointer must move to reach said even balance mark.

3. In a scale, as a subcombination, a rockable beam, a counterweight mounted on the beam for movement along the beam to different positions, actuating means for the counterweight carried by the beam, a frame, a device movably mounted on the frame and having a normal position in which it is free of effect on the beam during rocking of the beam and movable away from said normal position to engage and operate said actuating means for moving the counterweight along the beam, and means for urging the device to move towards its normal position.

4. In a scale, as a subcombination, a rockable beam, a counterweight mounted on the beam for movement along the beam to different positions, actuating means for the counterpoise carried by the beam, a frame, and a device movably mounted on the frame and having a central position in which it is free of said actuating means during rocking of the beam and movable to either side of its central position to engage and operate said actuating means for moving the counterweight along the beam in a direction depending upon the direction of movement of the device with respect to its central position.

5. The subcombination as defined in claim 4, a chart carried by said frame and said device including an index coacting with the chart for indicating the direction of movement of the device.

6. The subcombination as defined in claim 4, said device being pivotally mounted on said frame, and an equalizer carried by the frame and coacting with said device for urging the device to its normal position.

7. The subcombination as defined in claim 4, said device being manually movable away from its normal position, and means for automatically returning the device to its normal position.

8. In a scale, as a subcombination, a rockable beam, a counterweight carried by the beam for movement therealong, actuating means mounted on the beam for moving the counterweight along the beam, a frame, a device pivotally carried by the frame, and a pin and slot connection between said device and said actuating means for imparting movement to the latter upon rocking of said device to thereby move the counterweight along the beam.

9. The subcombination as defined in claim 8, said device having a central position and the pin and slot of said connection being free of engagement during rocking of the beam while said device is at its central position.

10. In a scale, as a subcombination, a rockable beam, a counterweight carried by the beam for movement therealong, an endless belt connected to the counterweight, and movable to adjust the counterweight along the beam, pulleys journaled on the beam for carrying the belt, one of said pulleys being a driving wheel having a toothed element rigid therewith, a pawl for coacting with the toothed element, a plate pivotally mounted on the beam for carrying said pawl, and means for rocking said plate to engage the pawl with the toothed element for rotating the driving pulley to actuate said belt for adjusting the counterweight along the beam.

11. In a scale, as a subcombination, a rockable beam, a counterweight carried by the beam and movable therealong, an endless belt connected to the counterweight, pulleys journaled on the beam around which the belt runs and including a driving pulley rotation of which moves the belt to adjust the counterweight along the beam, and ratchet means for rotating the driving pulley in either of opposite directions to move the belt for adjusting the counterweight in correspondingly opposite directions along the beam.

12. In a scale, a rockable beam, a counterweight carried by the beam for movement therealong, an endless belt connected to the counterweight, pulleys journaled on the beam around which the belt runs and including a driving pulley, rotation of which drives the belt to shift the counterweight along the beam, and ratchet means for rotating the driving pulley comprising a pair of toothed elements connected with the driving pulley, a pair of pawls, one for each of the toothed elements, a pair of plates pivotally mounted on the beam, one for carrying one of said pawls and the other for carrying the other pawl, and means for rocking the plates one at a time but in opposite directions to cause the pawls to engage their respective toothed elements for alternatively rotating said driving pulley in opposite directions.

13. In a scale, a rockable beam having a counterweight movable therealong, an endless belt drivingly attached at one side to the counterweight, guide pulleys for the belt journaled on the beam and including a driving pulley, toothed means connected to the driving pulley, a pair of pawls for coacting with the toothed means, a device movably mounted on the beam and having a central position and movable in either direction away from its central position, and connections between said device and the pawls for rocking said pawls one at a time but in opposite directions upon movement of the device in opposite directions to thereby cause the pawls to alternatively rotate said driving pulley in opposite directions to shift the counterweight in either of opposite directions along the beam.

14. In a scale, a rockable beam having a counterweight movable therealong and actuating means for shifting the counterweight along the beam comprising a device movably mounted on the beam and having a central position, connections between said device and counterweight for shifting the counterweight along the beam in either of opposite directions depending on the direction of movement of said device away from its central position, and means carried by the beam and acting on said device to normally urge it to maintain its central position.

15. In a scale, a rockable beam having a counterweight movable therealong and actuating means for the counterweight comprising a member slidably mounted on the beam for movement along the beam and having a central position, connections between the slidable member and the counterweight for moving the latter in either of opposite directions depending on the direction of movement of the member away from its central position, and an equalizer acting on the member for normally maintaining it in its central position.

16. In a scale, a rockable beam carrying a counterweight for movement along the beam, a reciprocatably mounted actuating member, a pair of separate ratcheting devices, connections between the ratcheting devices and the counterweight, and means operated by the actuating member upon movement of the latter in one direction for effecting through one of said ratcheting devices and said connections a forward movement of the counterweight along the beam and operated by the actuating member upon movement of the latter in the opposite direction for acting through the other ratcheting device and said connections for effecting return movement of the counterweight.

EDWARD J. VON PEIN.